(12) United States Patent
Bao et al.

(10) Patent No.: US 11,550,124 B2
(45) Date of Patent: Jan. 10, 2023

(54) CAMERA LENS INCLUDING SIX LENSES OF −++−++ REFRACTIVE POWERS, CAMERA MODULE AND VEHICLE

(71) Applicant: JIANGXI LIANCHUANG ELECTRONIC CO., LTD., Nanchang (CN)

(72) Inventors: Yumin Bao, Nanchang (CN); Xinyue Zhang, Nanchang (CN); Xuming Liu, Nanchang (CN); Kemin Wang, Nanchang (CN); Jiyong Zeng, Nanchang (CN)

(73) Assignee: JIANGXI LIANCHUANG ELECTRONIC CO., LTD., Nanchang (CN)

( * ) Notice: Subject to any disclaimer, the term of this patent is extended or adjusted under 35 U.S.C. 154(b) by 450 days.

(21) Appl. No.: 16/857,173

(22) Filed: Apr. 23, 2020

(65) Prior Publication Data
US 2020/0249432 A1    Aug. 6, 2020

Related U.S. Application Data

(63) Continuation of application No. PCT/CN2019/106772, filed on Oct. 11, 2019.

(30) Foreign Application Priority Data

Nov. 23, 2018   (CN) .......................... 201811412874.2

(51) Int. Cl.
*G02B 9/62* (2006.01)
*G02B 13/00* (2006.01)

(52) U.S. Cl.
CPC .............. *G02B 9/62* (2013.01); *G02B 13/002* (2013.01); *G02B 13/005* (2013.01); *G02B 13/006* (2013.01); *G02B 13/0045* (2013.01)

(58) Field of Classification Search
CPC .... G02B 9/62; G02B 13/005; G02B 13/0045; G02B 13/006
See application file for complete search history.

(56) References Cited

U.S. PATENT DOCUMENTS

| 5,442,485 A | 8/1995 | Yamanashi |
| 2016/0124192 A1 | 5/2016 | Koreeda |
| 2018/0210178 A1 | 7/2018 | Saito |

FOREIGN PATENT DOCUMENTS

| CN | 101587231 A | 11/2009 |
| CN | 104233076 A | 12/2014 |

(Continued)

OTHER PUBLICATIONS

JPO, Office Action for JP Application No. 20210503533, dated Feb. 1, 2022.

(Continued)

*Primary Examiner* — Wen Huang

(57) ABSTRACT

The disclosure provides a camera lens, a camera module and vehicle camera. The camera lens sequentially includes a first group, a stop, and a second group along an optical axis from an object side to an imaging surface. The first group includes a biconcave first lens and a biconvex second lens. The second group includes a third lens, a fourth lens, a fifth lens and a sixth lens. The third lens has a positive refractive power, a convex object side surface and a concave image side surface. The fourth lens has a negative refractive power and is a biconcave lens. The fifth lens has a positive refractive power and is a biconvex lens. The sixth lens has a positive refractive power, a convex object side surface and a concave image side surface. The fourth lens and the fifth lens form a cemented body with a positive refractive power.

20 Claims, 8 Drawing Sheets

(56) References Cited

FOREIGN PATENT DOCUMENTS

| | | | |
|---|---|---|---|
| CN | 104777589 | A | 7/2015 |
| CN | 105204140 | A | 12/2015 |
| CN | 105988193 | A | 10/2016 |
| CN | 107783256 | A | 3/2018 |
| CN | 107957618 | A | 4/2018 |
| CN | 108051899 | A | 5/2018 |
| CN | 109445067 | A | 3/2019 |
| JP | 2010085732 | A | 4/2010 |
| JP | 2016065954 | A | 4/2016 |
| JP | 2016188895 | A | 11/2016 |

OTHER PUBLICATIONS

EPO, Office Action for EP Application No. 19887441.4, dated Nov. 22, 2021.
First office action issuedin corresponding Chinese application No. 201811412874.2 dated Dec. 27, 2019(11 pages).
International Search Report issued in corresponding international application No. PCT/CN2019/106772, dated Dec. 30, 2019(8 pages).
Written Opinion of International Search Authority issued in corresponding International application No. PCT/CN2019/106772, dated Dec. 30, 2019(6 pages).

CAMERA LENS INCLUDING SIX LENSES OF –++–++ REFRACTIVE POWERS, CAMERA MODULE AND VEHICLE

CROSS REFERENCE TO RELATED APPLICATION(S)

This application is a continuation of PCT Application Serial No. PCT/CN2019/106772, filed on Oct. 11, 2019, which entitled "OPTICAL IMAGING CAMERA LENS AND IMAGING DEVICE". The PCI application claims priority to a Chinese application No. 2018114128742, filed on Nov. 23, 2018, titled "OPTICAL IMAGING CAMERA LENS AND IMAGING DEVICE". The entirety of the above-mentioned application is hereby incorporated by reference herein.

TECHNICAL FIELD

The disclosure relates to the field of camera technologies, and more particularly, to an optical imaging camera lens, a camera module and a vehicle camera.

BACKGROUND

With the development of automatic driving, vehicle lenses, as key components of automatic driving assistance systems, are also in rapid development. The requirements for the vehicle lenses also become higher and higher. Compared with ordinary optical lenses, the vehicle lens of the automatic driving assistance system is required to have higher imaging clarity to meet high requirements of the automatic driving assistance system. However, under the conditions of high temperature or low temperature, it is difficult for the conventional vehicle lens to form clear images.

SUMMARY

An object of the disclosure is to provide an optical imaging camera lens, an imaging device, a camera module and a vehicle camera to solve the above problems.

The embodiments of the disclosure achieve the foregoing object through the following technical solutions:

In a first aspect, the disclosure provides an optical imaging camera lens, which sequentially includes a first group, a stop, and a second group along an optical axis from an object side to an imaging surface. The first group has a negative refractive power, and sequentially includes a first lens and a second lens from the object side to the imaging surface. The first lens has a negative refractive power, an object side surface and an image side surface of the first lens are both concave surfaces. The second lens has a positive refractive power, an object side surface and an image side surface of the second lens are both convex surfaces. The second group has a positive refractive power, and sequentially includes a third lens, a fourth lens, a fifth lens and a sixth lens from the object side to the imaging surface. The third lens has a positive refractive power, an object side surface of the third lens is a convex surface and an image side surface of the third lens is a concave surface. The fourth lens has a negative refractive power, an object side surface and an image side surface of the fourth lens are both concave surfaces. The fifth lens has a positive refractive power, an object side surface and an image side surface of the fifth lens are both convex surfaces. The sixth lens has a positive refractive power, an object side surface of the sixth lens is a convex surface and an image side surface of the sixth lens is a concave surface. The fourth lens and the fifth lens form a cemented body with a positive refractive power. The stop is arranged between the first group and the second group.

In a second aspect, the disclosure provides an imaging device, including the above optical imaging camera lens of the first aspect.

In a third aspect, the disclosure provides a camera module, which includes the optical imaging camera lens as mentioned above, a barrel, a holder and an image sensor. The optical imaging camera lens is received in the barrel, and the barrel is engaged with the holder. The image sensor is substantially accommodated in the holder and opposite to the optical imaging camera lens. The image sensor is configured for converting light signals into electrical signals, thereby the images formed by the optical imaging camera lens can be converted and transmitted to a processor.

In a fourth aspect, the disclosure provides a vehicle camera, which includes a camera module as mentioned above, a processor, and a memory, wherein the camera module is configured to capture images, the processor is configured to process the captured images, and the memory is configured to store the captured images.

Compared with the prior art, in the optical imaging camera lens, the camera module and the vehicle camera provided by the disclosure, the first group can provide a relatively large field of view (FOV), the second group can effectively shorten the total length of the optical imaging camera lens, the cemented body formed by the fourth lens and the fifth lens can reduce the lens aberration. The optical imaging camera lens, the imaging device, the camera module and the vehicle camera provided by the disclosure have good imaging quality.

These or other aspects of the disclosure will become apparent and understandable in the description of the following embodiments.

REFERENCE NUMERALS OF MAIN COMPONENTS

Figure 1:
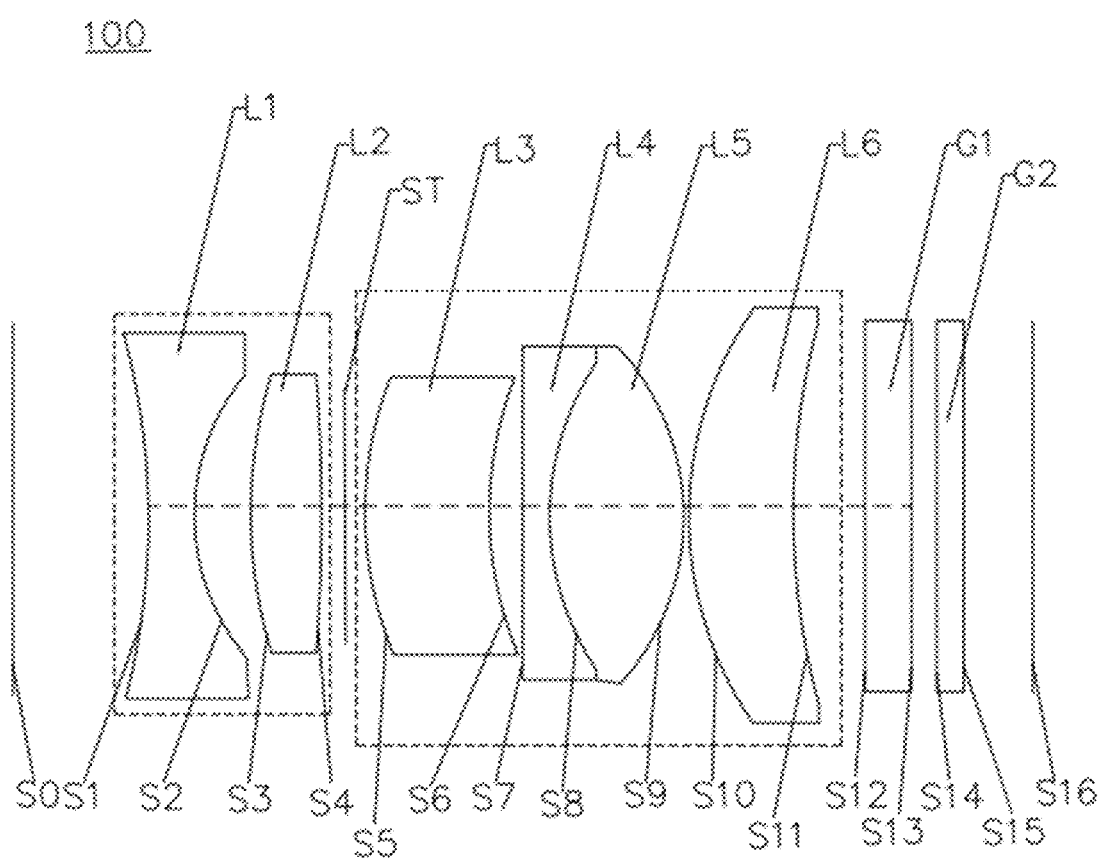
FIG. 1 is a schematic structural diagram showing a cross-section of an optical imaging camera lens according to an embodiment of the disclosure.

| optical imaging camera lens | 100 | first group | Q1 |
| first lens | L1 | second lens | L2 |
| second group | Q2 | third lens | L3 |
| fourth lens | L4 | fifth lens | L5 |
| sixth lens | L6 | stop | ST |
| filter | G1 | flat glass | G2 |

The following specific embodiments will further explain the disclosure with reference to the above drawings.

DETAILED DESCRIPTION OF PREFERRED EMBODIMENTS

In order to better understand the disclosure, the disclosure will be further explained below with reference to the accompanying drawings. The drawings illustrate embodiments of the disclosure, but the disclosure is not limited to these embodiments. Instead, the purpose of providing these embodiments is to make the disclosure more thorough and comprehensive.

The disclosure provides an optical imaging camera lens, which sequentially includes a first group, a stop, and a second group along an optical axis from an object side to an imaging surface. The first group has a negative refractive power, and sequentially includes a first lens and a second lens from the object side to the imaging surface. The first lens has a negative refractive power, an object side surface and an image side surface of the first lens are both concave surfaces. The second lens has a positive refractive power, an object side surface and an image side surface of the second lens are both convex surfaces. The second group has a positive refractive power, and sequentially includes a third lens, a fourth lens, a fifth lens and a sixth lens from the object side to the imaging surface. The third lens has a positive refractive power, an object side surface of the third lens is a convex surface and an image side surface of the third lens is a concave surface. The fourth lens has a negative refractive power, an object side surface and an image side surface of the fourth lens are both concave surfaces. The fifth lens has a positive refractive power, an object side surface and an image side surface of the fifth lens are both convex surfaces. The sixth lens has a positive refractive power, an object side surface of the sixth lens is a convex surface and an image side surface of the sixth lens is a concave surface. The fourth lens and the fifth lens form a cemented body with a positive refractive power. The stop is arranged between the first group and the second group.

In one embodiment, the optical imaging camera lens of the disclosure satisfies the following expression:

$$0.7 < IH/(f*\tan\theta) < 1;$$

where IH represents a half actual image height of the optical imaging camera lens, f represents a focal length of the entire optical imaging camera lens, and θ represents a half-FOV of the optical imaging camera lens. This expression reflects the f the actual image height to the ideal image height.

In one embodiment, the optical imaging camera lens of the disclosure satisfies the following expression:

$$0.2 < \varphi_{45}/\varphi < 1.3;$$

where $\varphi_{45}$ represents a refractive power of a combination of the fourth lens and the fifth lens, φ represents a refractive power of the entire optical imaging camera lens. When the ratio of the refractive power of the combination of the fourth lens and the fifth lens to the refractive power of the optical imaging camera lens is within the above range, the chromatic aberration of the optical imaging camera lens can he effectively corrected and the resolution of the optical imaging camera lens can be improved.

In one embodiment, the optical imaging camera lens of the disclosure satisfies the following expression:

$$-0.06 < \varphi_4 + \varphi_5 < 0.01;$$

where $\varphi_4$ represents a refractive power of the fourth lens, $\varphi_5$ represents a refractive power of the fifth lens. When the sum of the refractive power of the fourth lens and the fifth lens is within the above range, the chromatic aberration of the optical imaging camera lens can be effectively corrected and the resolution of the optical imaging camera lens can be improved.

In one embodiment, the optical imaging camera lens of the disclosure satisfies the following expressions:

$$(dn/dt)_2 > 2.5 \times 10^{-6}/°C.;$$

$$(dn/dt)_5 \leq -2 \times 10^{-6}/°C.;$$

where $(dn/dt)_2$ represents a temperature coefficient of refractive index of the second lens, $(dn/dt)_5$ represents a temperature coefficient of refractive index of the fifth lens. The temperature coefficient of refractive index of the second lens and the temperature coefficient of refractive index of the fifth lens are within these ranges, which can effectively reduce the sensitivity of the optical imaging camera lens to temperature, enables the optical imaging camera lens can form clear images in a relatively large temperature range (for example, −40° C. to +105° C.), and improves the stability of the optical imaging camera lens resolution at different temperatures.

In one embodiment, the optical imaging camera lens of the disclosure satisfies the following expressions:

$$Vd_2 < 40;$$

$$Vd_3 < 31;$$

$$Vd_4 < 25$$

where $Vd_2$ represents an abbe number of a material of the second lens, $Vd_3$ represents an abbe number of a material of the third lens, $Vd_4$ represents an abbe number of a material of the fourth lens. The abbe numbers of the materials of the second lens, the third lens and the fourth lens satisfy the above expressions, which is favorable for correcting the chromatic aberration of the optical imaging camera lens.

In one embodiment, the optical imaging camera lens of the disclosure satisfies the following expression:

$$-4.5<r_1/r_2<-3.0;$$

where $r_1$ represents a radius of curvature of an object side surface of the first lens, $r_2$ represents a radius of curvature of an image side surface of the first lens.

In one embodiment, the optical imaging camera lens of the disclosure satisfies the following expression:

$$d_{12}>d_{34}>d_{56};$$

where $d_{12}$ represents the distance between the first lens and the second lens on the optical axis, $d_{34}$ represents the distance between the third lens and the fourth lens on the optical axis, $d_{56}$ represents the distance between the fifth lens and the sixth lens on the optical axis.

In one embodiment, the optical imaging camera lens of the disclosure satisfies the following expression:

$$D_6>D_1>D_2;$$

where $D_1$ represents the maximum diameter of the first lens, $D_2$ represents the maximum diameter of the second lens, $D_6$ represents the maximum diameter of the sixth lens.

In one embodiment, the F number F# of the optical imaging camera lens provided by the disclosure meets F#<1.7, which can satisfy imaging requirements of the optical imaging camera lens in bright and dark environments.

In one embodiment, every lens in the optical imaging camera lens provided by the disclosure is a glass spherical lens. The use of glass lenses can effectively delay the aging of the optical imaging camera lens, and can enable the optical imaging camera lens to have good temperature control, adapt to different temperature occasions, and have a long life and a high stability. The use of spherical lenses can effectively reduce production cost of the optical imaging camera lens.

In one embodiment, a total optical length of the optical imaging camera lens provided by the disclosure is less than 21 mm which is beneficial to the miniaturization of the optical imaging camera lens.

In one embodiment, the disclosure further provides an imaging device, which includes the optical imaging camera lens provided in any one of the above embodiments. The imaging device may be a vehicle-mounted device, a monitoring device, or any imaging device using the optical imaging camera lens described above.

In one embodiment, the disclosure provides a camera module, which includes the optical imaging camera lens as mentioned above, a barrel, a holder, an image sensor, and a printed circuit board. The optical imaging camera lens is received in the barrel, and the barrel is engaged with the holder. The image sensor and the printed circuit board are substantially accommodated in the holder. The image sensor is opposite to the optical imaging camera lens and is mounted on the printed circuit board. The image sensor is configured for converting light signals into electrical signals, thereby the images formed by the optical imaging camera lens can be converted and transmitted to a processor via the printed circuit board.

In one embodiment, the disclosure provides a vehicle camera, which includes a camera module as mentioned above, a processor, and a memory, wherein the camera module is configured to capture images, the processor is configured to process the captured images, and the memory is configured to store the captured images.

In the optical imaging camera lens, the imaging device, the camera module, and the vehicle camera provided by the disclosure, the first group can provide a relatively large FOV, the second group can effectively shorten the total length of the optical imaging camera lens, wherein the cemented body formed by the fourth lens and the fifth lens can reduce the aberration of the optical imaging camera lens. The optical imaging camera lens, the imaging device, the camera module, and the vehicle camera provided by the disclosure can provide good imaging quality.

In the embodiments of the disclosure, the cross-sectional structure of the optical imaging camera lens is illustrated in FIG. 1. Relevant parameters of every lens in the optical imaging camera lens are shown in Tables 1-4, where r represents a radius of curvature of the apex of an optical surface, d represents a distance between optical surfaces (a distance between the apexes of two adjacent optical surfaces), $n_d$ represents a refractive index of every lens, and Vd represents the abbe number of the material of every lens. Optical characteristics corresponding to every embodiment are shown in Table 5, where f represents the focal length of the optical imaging camera lens, F# represents the F number, 2θ represents the FOV, and $T_L$ represents the total optical length of the optical imaging camera lens.

In the following embodiments, the structures of the optical imaging camera lenses in the embodiments are similar, the differences are: the thickness, the radius of curvature, and the selection of materials of every lens in the optical imaging camera lens, The specific differences can be referred to the parameter tables of the embodiments.

Embodiment 1

Please refer to FIG. 1, an embodiment provides an optical imaging camera lens 100, which sequentially includes a first group Q1, a stop ST, a second group Q2 and a filter G1 along an optical axis from an object side S0 to an imaging surface S16.

The first group Q1 has a positive refractive power and includes a first lens L1 and a second lens L2 from the object side S0 to the imaging surface S16. The first lens L1 has a negative refractive power, an object side surface S1 and an image side surface S2 of the first lens L1 are both concave surfaces. The second lens L2 has a positive refractive power, an object side surface S3 and an image side surface S4 of the second lens L2 are both convex surfaces.

The second group Q2 has a positive refractive power, and sequentially includes a third lens L3, a fourth lens L4, a fifth lens L5 and a sixth lens L6 from the object side S0 to the imaging surface S16, The third lens L3 has a positive refractive power, an object side surface S5 of the third lens L3 is a convex surface and an image side surface S6 of the third lens L3 is a concave surface. The fourth lens L4 has a negative refractive power, an object side surface S7 and an image side surface S8 of the fourth lens L4 are both concave surfaces. The fifth lens L5 has a positive refractive power, an object side surface S8 (is attached to the image side surface of the fourth lens L4 and shares a same reference numeral) and an image side surface S9 of the fifth lens L5 are both convex surfaces. The sixth lens L6 has a positive refractive power, an object side surface S10 of the sixth lens L6 is a convex surface and an image side surface S11 of the sixth lens L6 is a concave surface. The fourth lens L4 and the fifth lens L5 form a cemented body with a positive refractive power, in detail, the image side surface S8 of the fourth lens L4 is bonded with the object side surface S8 of the fifth lens L5.

The stop ST is arranged between the first group Q1 and the second group Q2.

The filter G1 is arranged between the second group Q2 and the imaging surface S16. The filter G1 includes an object side surface S12 and an image side surface S13.

The optical imaging camera lens 100 of the embodiment further includes a flat glass G2. The flat glass G2 is arranged between the filter G1 and the imaging surface S16. The flat glass G2 includes an object side surface S14 and an image side surface S15.

Relevant parameters of every lens in the optical imaging camera lens 100 provided by this embodiment are shown in Table 1.

TABLE 1

| Surface No. | | r | d | $n_d$ | Vd |
|---|---|---|---|---|---|
| Object surface | | — | Infinity | | |
| S1 | First lens L1 | −16.425 | 1.00 | 1.52 | 64.2 |
| S2 | | 4.542 | 2.00 | | |
| S3 | Second lens L2 | 12.374 | 1.53 | 1.91 | 35.3 |
| S4 | | −24.301 | 0.11 | | |
| ST | stop | — | 0 | | |
| S5 | Third lens L3 | 7.958 | 2.64 | 1.85 | 23.8 |
| S6 | | 7.705 | 0.74 | | |
| S7 | Fourth lens L4 | −65.822 | 0.5 | 1.92 | 20.9 |
| S8 | Fifth lens L5 | 5.892 | 2.84 | 1.59 | 68.5 |
| S9 | | −5.444 | 0.1 | | |
| S10 | Sixth lens L6 | 7.802 | 2.2,7 | 1.90 | 37.1 |
| S11 | | 16.320 | 0.70 | | |
| S12 | Filter G1 | — | 0.55 | 1.517 | 64.21 |
| S13 | | — | 4.52 | | |
| S14 | Flat glass G2 | — | 0.40 | 1.517 | 64.21 |
| S15 | | — | 0.125 | | |
| S16 | imaging surface | — | — | | |

Figure 2:
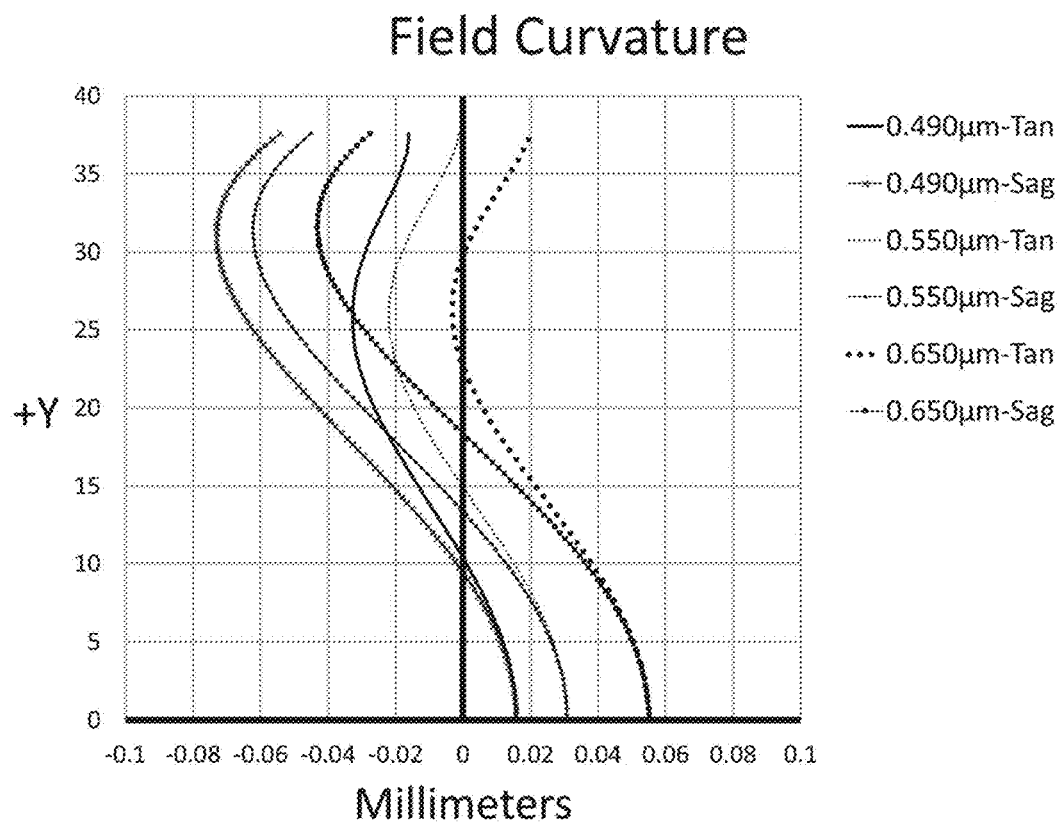
FIG. 2 is a diagram showing field curvature curves of the optical imaging camera lens according to a first embodiment of the disclosure.
Figure 3:
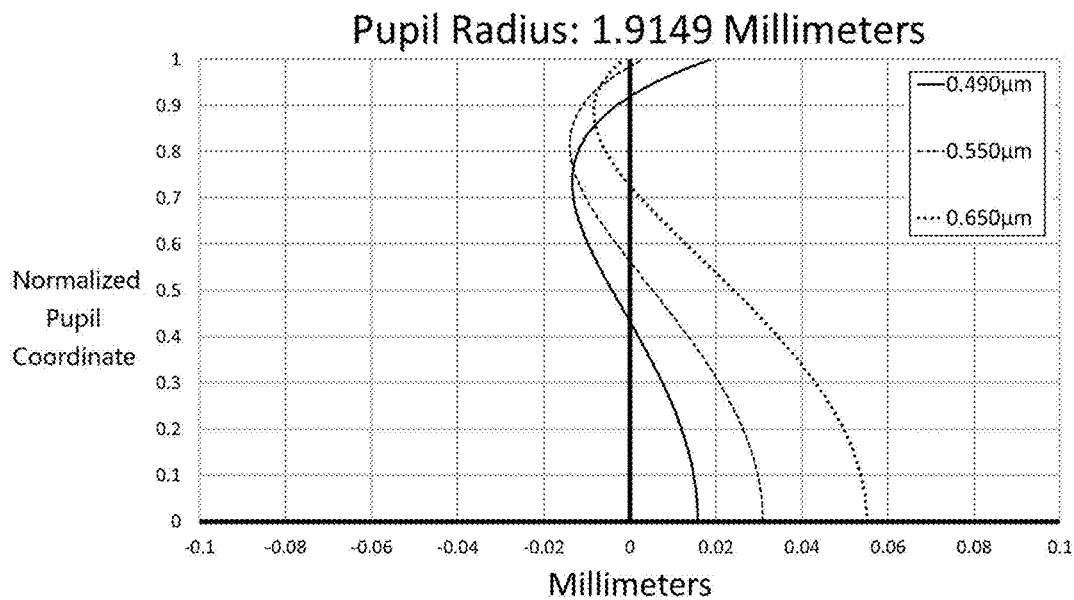
FIG. 3 is a diagram showing axial spherical aberration curves of the optical imaging camera lens according to the first embodiment of the disclosure.
Figure 4:
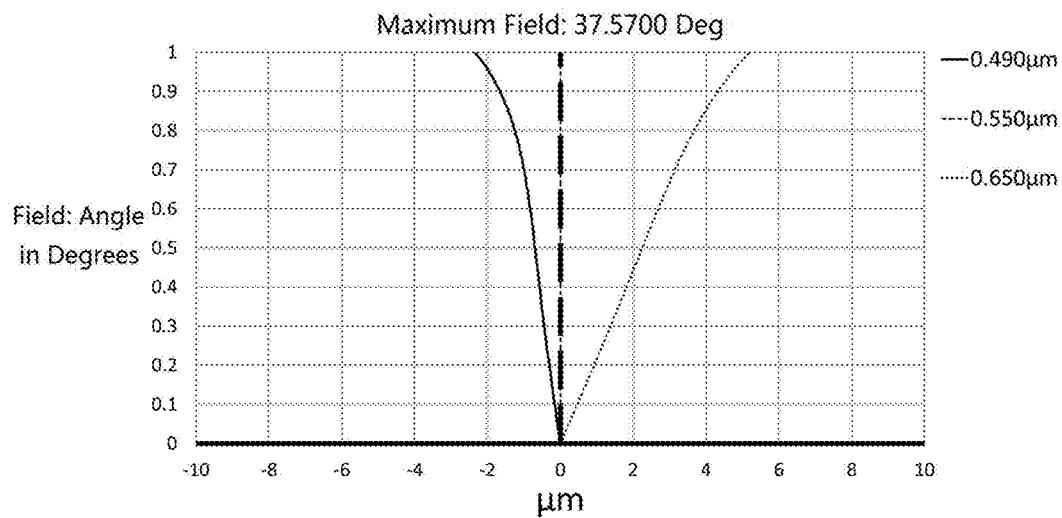
FIG. 4 is a diagram showing a lateral chromatic aberration curve of the optical imaging camera lens according to the first embodiment of the disclosure.

In this embodiment, the curves of the field curvature, the axial spherical aberration and the lateral chromatic aberration are shown in FIG. 2, FIG. 3, and FIG. 4, respectively. From FIG. 2 to FIG. 4, it is apparent that the field curvature and the chromatic aberration can be well corrected in this embodiment.

Embodiment 2

The structure of an optical imaging camera lens provided in the second embodiment of the disclosure is similar to that of the first embodiment, and relevant parameters of every lens in the optical imaging camera lens of the second embodiment are shown in Table 2.

TABLE 2

| Surface No. | | r | d | $n_d$ | Vd |
|---|---|---|---|---|---|
| Object surface | | — | Infinity | | |
| S1 | First lens L1 | −16.164 | 1.00 | 1.52 | 64.2 |
| S2 | | 4.587 | 2.00 | | |
| S3 | Second lens L2 | 11.844 | 1.58 | 1.90 | 31.3 |
| S4 | | −20.597 | 0.10 | | |
| ST | stop | — | 0 | | |
| S5 | Third lens L3 | 7.568 | 2.36 | 1.83 | 42.7 |
| S6 | | 7.172 | 0.90 | | |
| S7 | Fourth lens L4 | −38.734 | 0.50 | 1.92 | 20.9 |
| S8 | Fifth lens L5 | 5.774 | 2.80 | 1.60 | 65.5 |
| S9 | | −5.519 | 0.10 | | |
| S10 | Sixth lens L6 | 7.688 | 3.08 | 1.83 | 37.2 |
| S11 | | 17.384 | 0.70 | | |
| S12 | Filter G1 | — | 0.55 | 1.517 | 64.21 |
| S13 | | — | 3.82 | | |
| S14 | Flat glass G2 | — | 0.40 | 1.517 | 64.21 |
| S15 | | — | 0.125 | | |
| S16 | Imaging surface | — | — | | |

Figure 5:
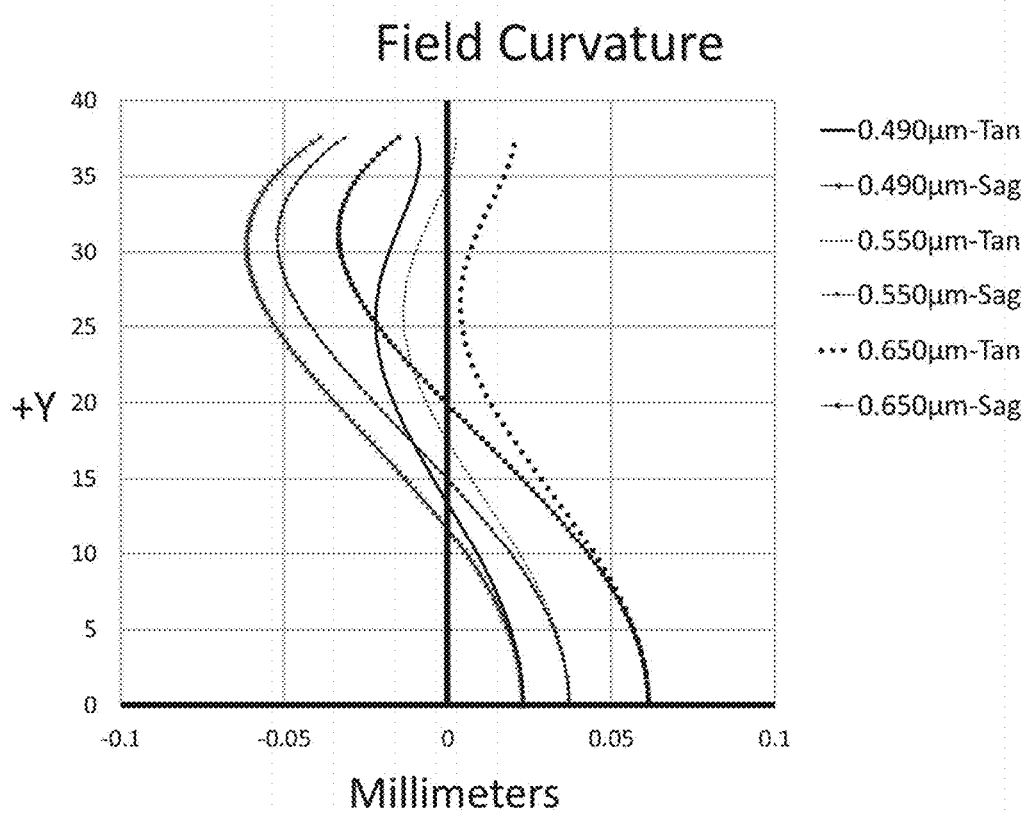
FIG. 5 is a diagram showing field curvature curves of the optical imaging camera lens according to a second embodiment of the disclosure.
Figure 6:
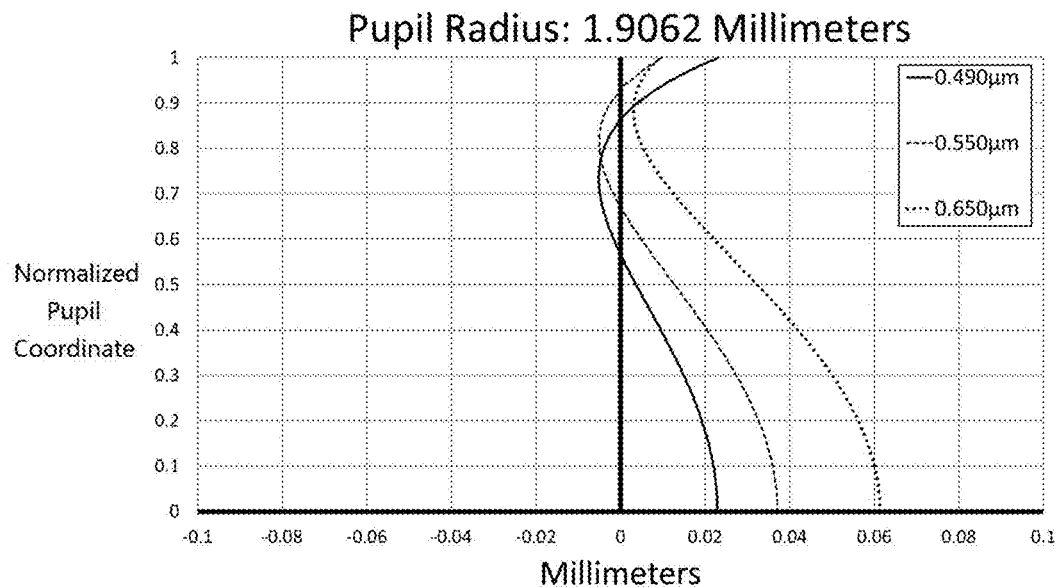
FIG. 6 is a diagram showing axial spherical aberration curves of the optical imaging camera lens according to the second embodiment of the disclosure.
Figure 7:
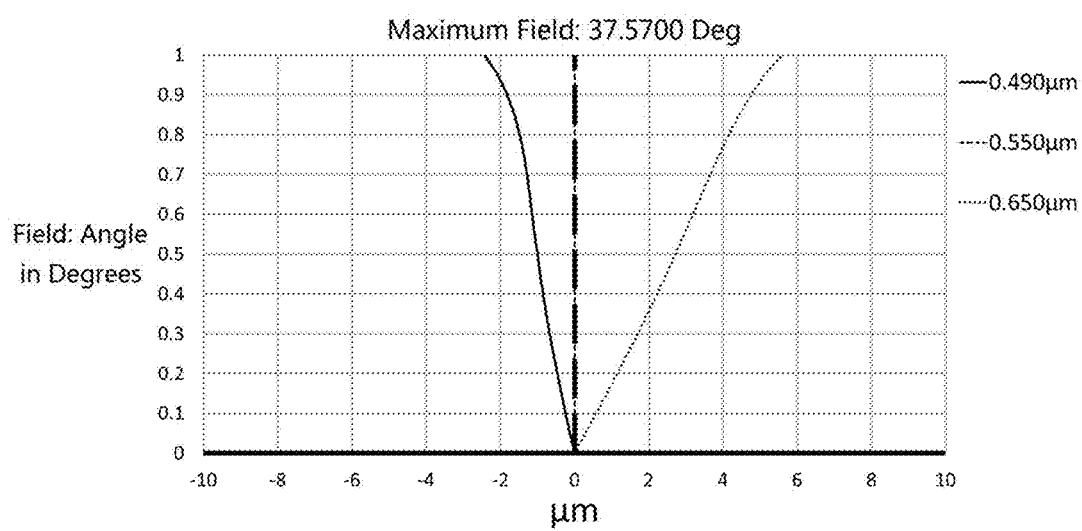
FIG. 7 is a diagram showing a lateral chromatic aberration curve of the optical imaging camera lens according to the second embodiment of the disclosure.

In this embodiment, the curves of the field curvature, the axial spherical aberration and the lateral chromatic aberration are shown in FIG. 5, FIG. 6, and FIG. 7, respectively. From FIG. 5 to FIG. 7, it is apparent that the field curvature and the chromatic aberration can be well corrected in this embodiment.

Embodiment 3

The structure of an optical imaging camera lens provided in the third embodiment of the disclosure is similar to that of the first embodiment, and relevant parameters of every lens in the optical imaging camera lens of the third embodiment are shown in Table 3.

TABLE 3

| Surface No. | | r | d | $n_d$ | Vd |
|---|---|---|---|---|---|
| Object surface | | — | Infinity | | |
| S1 | First lens L1 | −21.625 | 1.00 | 1.57 | 56.1 |
| S2 | | 5.070 | 2.00 | | |
| S3 | Second lens L2 | 26.677 | 1.57 | 1.90 | 31.3 |
| S4 | | −10.897 | 0.10 | | |
| ST | stop | — | 0 | | |
| S5 | Third lens L3 | 5.589 | 2.00 | 1.85 | 30.1 |
| S6 | | 5.926 | 1.15 | | |
| S7 | Fourth lens L4 | −15.432 | 0.50 | 1.92 | 20.9 |
| S8 | Fifth lens L5 | 5.667 | 2.83 | 1.59 | 67.3 |
| S9 | | −5.242 | 0.10 | | |
| S10 | Sixth lens L6 | 9.695 | 3.38 | 1.85 | 32.3 |
| S11 | | 77.028 | 0.70 | | |
| S12 | Filter G1 | — | 0.55 | 1.517 | 64.21 |
| S13 | | — | 3.62 | | |
| S14 | Flat glass G2 | — | 0.40 | 1.517 | 64.21 |
| S15 | | — | 0.125 | | |
| S16 | Imaging surface | — | — | | |

Figure 8:
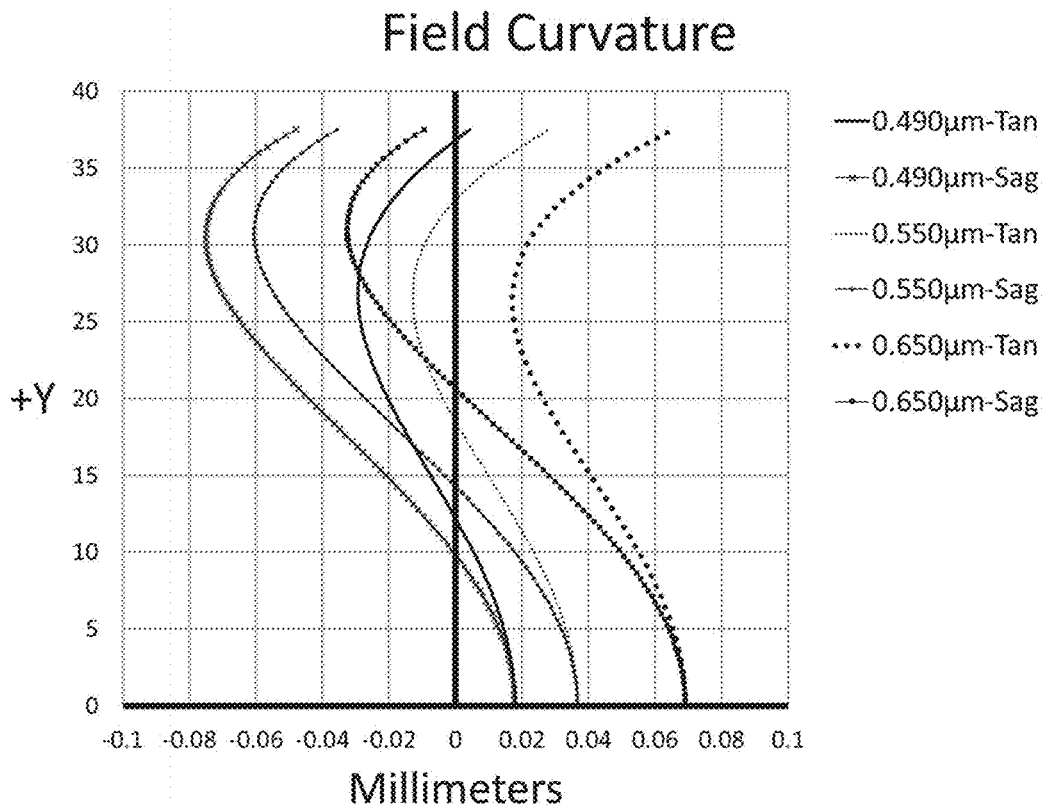
FIG. 8 is a diagram showing field curvature curves of the optical imaging camera lens according to a third embodiment of the disclosure.
Figure 9:
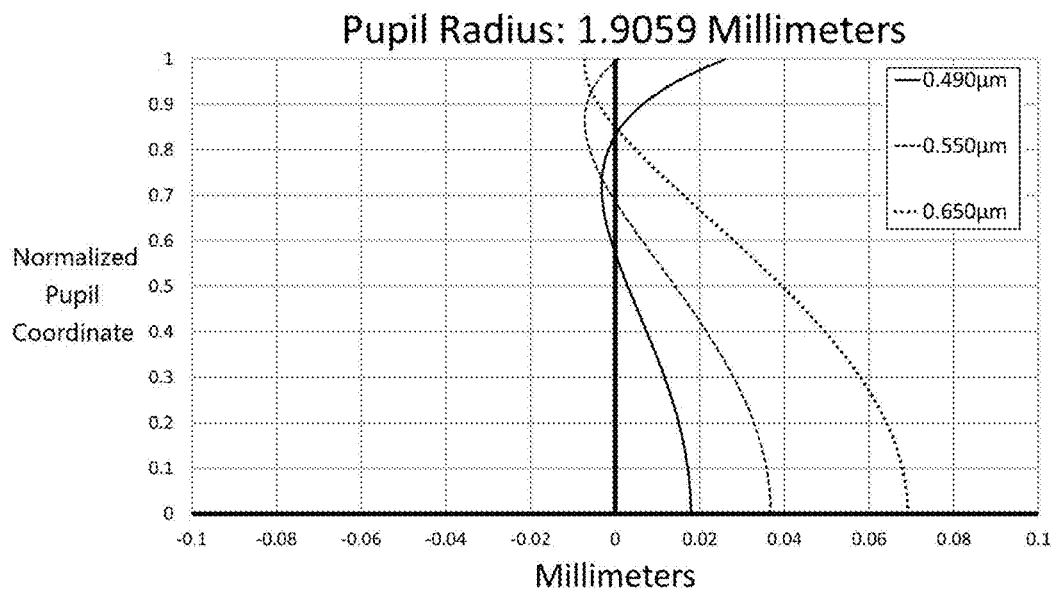
FIG. 9 is a diagram showing axial spherical aberration curves of the optical imaging camera lens according to the third embodiment of the disclosure.
Figure 10:
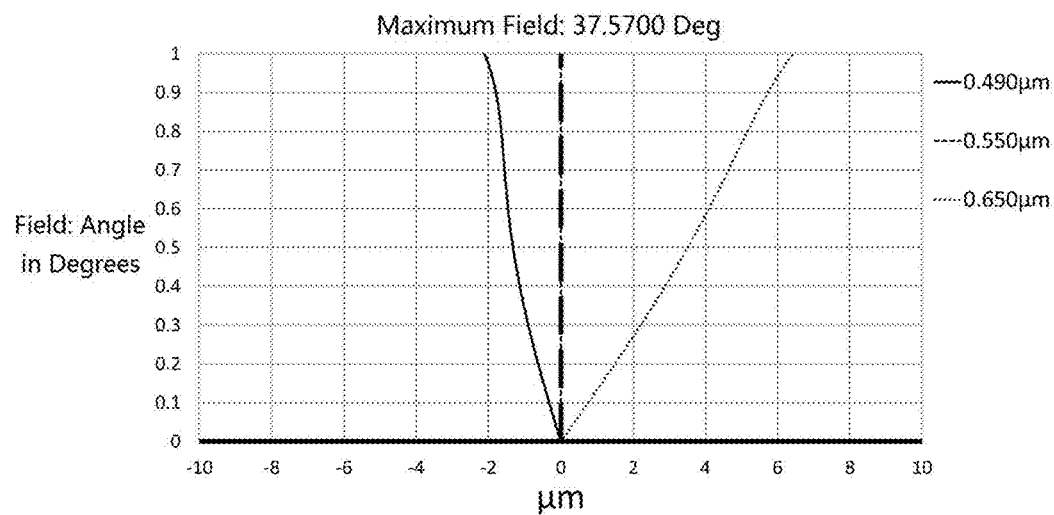
FIG. 10 is a diagram showing a lateral chromatic aberration curve of the optical imaging camera lens according to the third embodiment of the disclosure.

In this embodiment, the curves of the field curvature, the axial spherical aberration and the lateral chromatic aberration are shown in FIG. 8, FIG. 9, and FIG. 10, respectively. From FIG. 8 to FIG. 10, it is apparent that the field curvature and the chromatic aberration can be well corrected in this embodiment.

Embodiment 4

The structure of an optical imaging camera lens provided in the fourth embodiment of the disclosure is similar to that of the first embodiment, and relevant parameters of every lens in the optical imaging camera lens of the fourth embodiment are shown in Table 4.

TABLE 4

| Surface No. | | r | d | $n_d$ | Vd |
|---|---|---|---|---|---|
| Object surface | | — | Infinity | | |
| S1 | First lens L1 | −17.842 | 1.00 | 1.52 | 64.2 |
| S2 | | 4.400 | 2.00 | | |
| S3 | Second lens L2 | 12.802 | 1.53 | 1.90 | 31.3 |
| S4 | | −22.087 | 0.10 | | |
| ST | stop | — | 0 | | |

TABLE 4-continued

| Surface No. | | r | d | $n_d$ | Vd |
|---|---|---|---|---|---|
| S5 | Third lens L3 | 6.823 | 2.09 | 1.81 | 33.3 |
| S6 | | 6.304 | 0.99 | | |
| S7 | Fourth lens L4 | −53.402 | 0.5 | 1.92 | 20.9 |
| S8 | Fifth lens L5 | 6.126 | 2.86 | 1.62 | 63.9 |
| S9 | | −5.547 | 0.10 | | |
| S10 | Sixth lens L6 | 7.480 | 2.609 | 1.70 | 41.1 |
| S11 | | 20.922 | 0.70 | | |
| S12 | Filter G1 | — | 0.55 | 1.517 | 64.21 |
| S13 | | — | 2.156 | | |
| S14 | Flat glass G2 | — | 0.40 | 1.517 | 64.21 |
| S15 | | — | 0.125 | | |
| S16 | Imaging surface | — | — | | |

Figure 11:
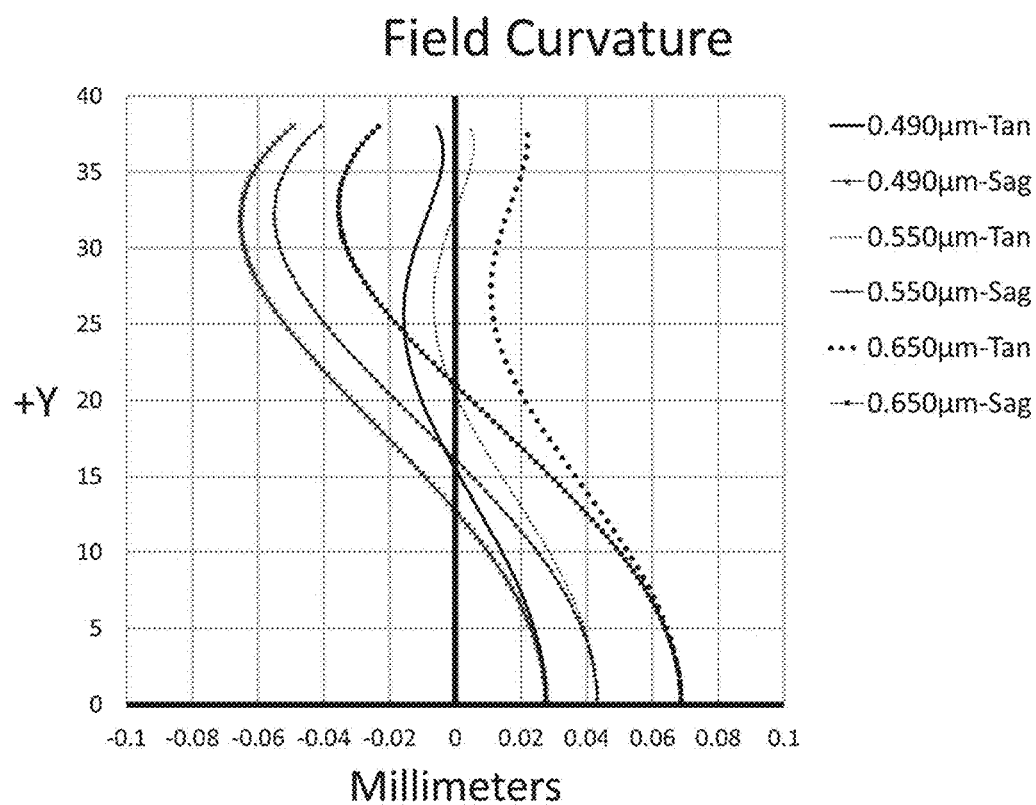
FIG. 11 is a diagram showing field curvature curves of the optical imaging camera lens according to a fourth embodiment of the disclosure.
Figure 12:
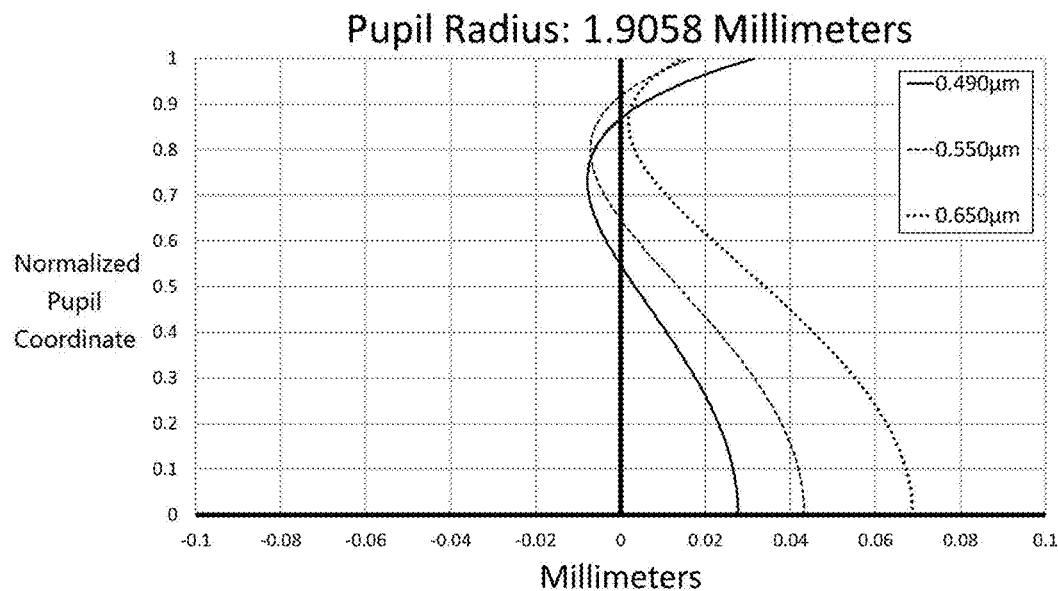
FIG. 12 is a diagram showing axial spherical aberration curves of the optical imaging camera lens according to the fourth embodiment of the disclosure.
Figure 13:
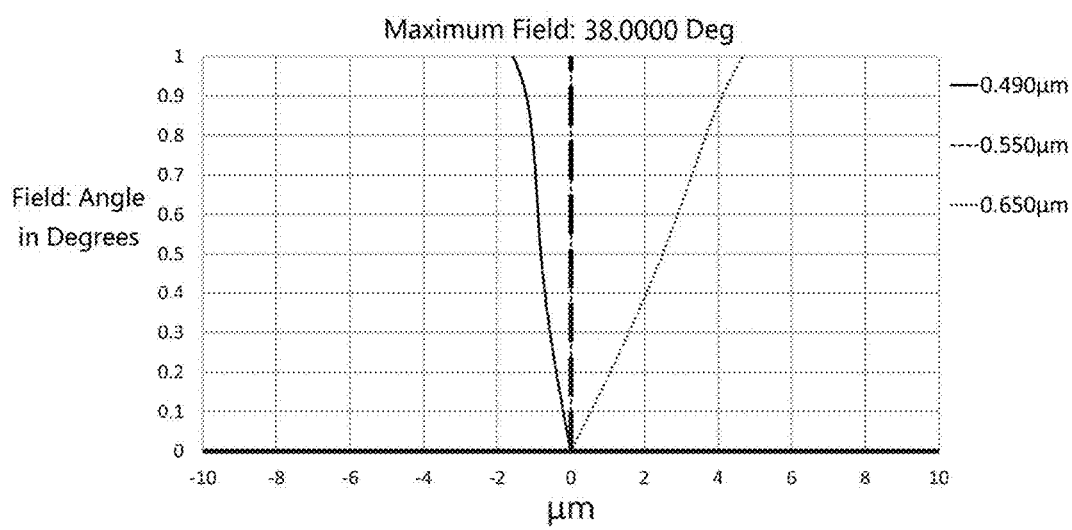
FIG. 13 is a diagram showing a lateral chromatic aberration curve of the optical imaging camera lens according to the fourth embodiment of the disclosure.

In this embodiment, the curves of the field curvature, the axial spherical aberration and the lateral chromatic aberration are shown in FIG. 11, FIG. 12, and FIG. 13, respectively. From FIG. 11 to FIG. 13, it is apparent that the field curvature and the chromatic aberration can be well corrected in this embodiment.

Table 5 shows optical characteristics corresponding; to the above first to fourth embodiments, including the system focal length f, the F number F#, the field of view 2θ, the total optical length $T_L$ and other values corresponding to the above-mentioned expressions.

TABLE 5

| | Embodiment | | | |
|---|---|---|---|---|
| | Embodiment 1 | Embodiment 2 | Embodiment 3 | Embodiment 4 |
| f (mm) | 6.13 | 6.1 | 6.1 | 6.1 |
| F# | 1.60 | 1.60 | 1.60 | 1.60 |
| 2θ | 76° | 75.6° | 75° | 76° |
| $T_L$ (mm) | 20 | 20 | 20 | 20 |
| IH/(f * tan θ) | 0.78 | 0.783 | 0.822 | 0.781 |
| $\varphi_{45}/\varphi$ | 1.166 | 1.11 | 0.995 | 1.060 |
| $\varphi_4 + \varphi_5$ | −0.009 | −0.018 | −0.055 | 0.003 |
| $(dn/dt)_5$ | −7.6 | −3.7 | −2.0 | −4.2 |
| $(dn/dt)_2$ | 4.4 | 2.6 | 2.6 | 2.6 |
| $r_1/r_2$ | −3.616 | −3.524 | −4.265 | −4.055 |

The optical imaging camera lens 100 of the disclosure adopts six glass lenses. Through the material selection of every lens and the appropriate matching of the refractive power, the optical imaging camera lens 100 can form clear images in the temperature range of −40° C. to +105° C. The first group Q1 is beneficial to provide a relatively large FONT, the second group Q2 is beneficial to effectively shorten the total length of the optical imaging camera lens 100 and can provide good imaging quality.

Embodiment 5

Figure 14:
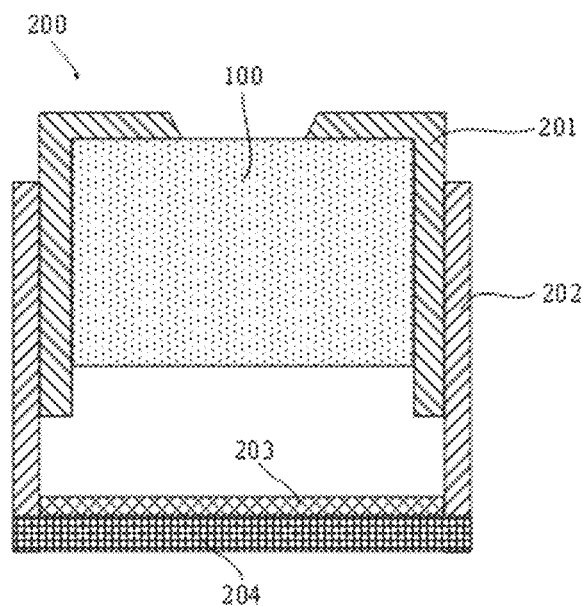
FIG. 14 is a schematic structural diagram showing a cross-section of a camera module according to a fifth embodiment of the disclosure.

FIG. 14 illustrates a camera module 200, which includes the optical imaging camera lens 100 of any embodiment as described above, a barrel 201, a holder 202, an image sensor 203, and a printed circuit board 204. The optical imaging camera lens 100 is received in the barrel 201, and the barrel 201 is engaged with the holder 202. The image sensor 203 and the printed circuit board 204 are substantially accommodated in the holder 202. The image sensor 203 is opposite to the optical imaging camera lens 100 and is mounted on the printed circuit hoard 204. The image sensor 203 is configured for converting light signals into electrical signals, thereby the images formed by the optical imaging camera lens 100 can be converted and transmitted to a processor. The printed circuit board 204 can be further electrically connected to a chip or the processor via a flexible circuit board.

Embodiment 6

Figure 15:
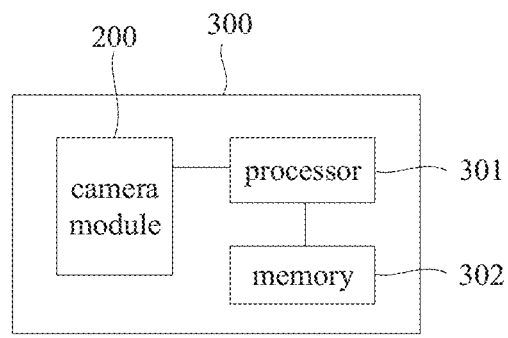
FIG. 15 is a schematic block diagram of a vehicle camera according to a sixth embodiment of the disclosure.
Figure 16:
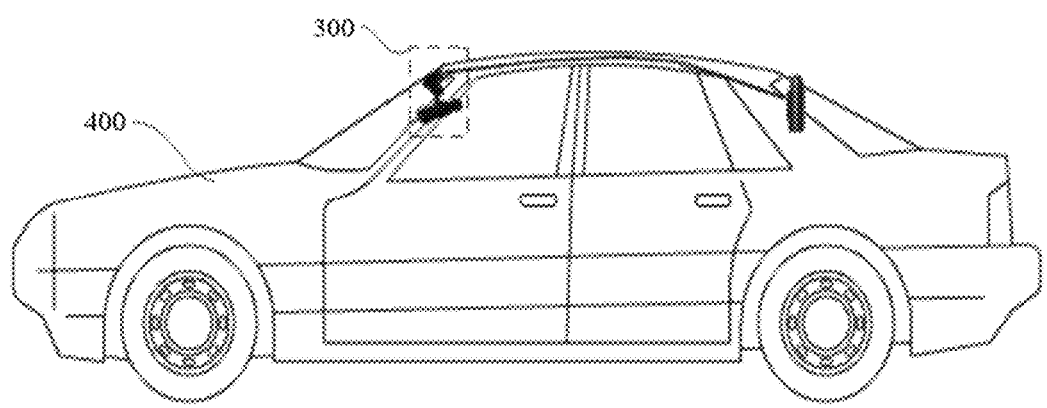
FIG. 16 is a schematic diagram of the vehicle camera according to the sixth embodiment of the disclosure.

FIGS. 15 and 16 illustrates a vehicle camera 300, which includes the camera module 200 as described above, a processor 301, and a memory 302. The camera module 200 is configured to capture images, the processor 301 is configured to process the captured images, and the memory 302 is configured to store the captured images. The processor 301 is communicated with the camera module 200 and the memory 302. That is, the electrical signals of the images can be transmitted to the processor 301 and stored in the memory 302. The vehicle camera 300 is installed in a car 400, and can be applied to an automatic driving system of the car 400.

In summary, the optical imaging camera lens 100, the imaging device, the camera module 200, and the vehicle camera 300 provided by the disclosure have good imaging quality.

The above embodiments just express several implementation manners of the disclosure, and the descriptions thereof are relatively specific and detailed, but cannot be understood as limiting the scope of the disclosure. It should be noted that, for those of ordinary skill in the art, without departing from the concept of the disclosure, modifications and improvements can be made, and these all belong to the scope of the disclosure. Therefore, the scope of the disclosure should be subject to the appended claims.

What is claimed is:

1. A camera lens, along an optical axis from an object side to an imaging surface, sequentially comprising:
   a first group with a negative refractive power, the first group comprising a first lens and a second lens from the object side to the imaging surface, wherein the first lens has a negative refractive power, a concave object side surface and a concave image side surface, the second lens has a positive refractive power, a convex object side surface and a convex image side surface;
   a stop; and
   a second group with a positive refractive power, the second group comprising a third lens, a fourth lens, a fifth lens and a sixth lens from the object side to the imaging surface, wherein the third lens has a positive refractive power, a convex object side surface and a concave image side surface, the fourth lens has a negative refractive power, a concave object side surface and a concave image side surface, the fifth lens has a positive refractive power, a convex object side surface and a convex image side surface, the sixth lens has a positive refractive power, a convex object side surface and a concave image side surface, the fourth lens and the fifth lens form a cemented body, the cemented body has a positive refractive power.

2. The camera lens as claimed in claim 1, wherein the camera lens satisfies the expression:

$$0.7 < IH/(f*\tan θ) < 1;$$

where IH represents a half actual image height of the camera lens, f represents a focal length of the camera lens, and θ represents a half-FOV of the camera lens.

3. The camera lens as claimed in claim 1, wherein the camera lens satisfies the expression:

$$0.2 < \varphi_{45}/\varphi < 1.3;$$

where $\varphi_{45}$ represents a refractive power of the cemented body, $\varphi$ represents a refractive power of the camera lens.

4. The camera lens as claimed in claim 1, wherein the camera lens satisfies the expression:

$$-0.06<\varphi_4+\varphi_5<0.01;$$

where $\varphi_4$ represents a refractive power of the fourth lens, $\varphi_5$ represents a refractive power of the fifth lens.

5. The camera lens as claimed in claim 1, wherein the camera lens satisfies the expressions:

$$(dn/dt)_2>2.5\times10^{-6}/°\ C.;$$

$$(dn/dt)_5\leq-2\times10^{-6}/°\ C.;$$

where $(dn/dt)_2$ represents a temperature coefficient of refractive index of the second lens, $(dn/dt)_5$ represents a temperature coefficient of refractive index of the fifth lens.

6. The camera lens as claimed in claim 1, wherein the camera lens satisfies the expressions:

$$Vd_2<40;$$

$$Vd_3<31;$$

$$Vd_4<25;$$

where $Vd_2$ represents an abbe number of a material of the second lens, $Vd_3$ represents an abbe number of a material of the third lens, $Vd_4$ represents an abbe number of a material of the fourth lens.

7. The camera lens as claimed in claim 1, wherein the F number F# of the camera lens meets F#<1.7.

8. The camera lens as claimed in claim 1, wherein each of the first lens to the sixth lens is a glass spherical lens.

9. The camera lens as claimed in claim 1, wherein a total optical length of the camera lens is less than 21 mm.

10. The camera lens as claimed in claim 1, wherein the camera lens satisfies the expression:

$$-4.5<r_1/r_2<-3.0;$$

where $r_1$ represents a radius of curvature of an object side surface of the first lens, $r_2$ represents a radius of curvature of an image side surface of the first lens.

11. The camera lens as claimed in claim 10, wherein the camera lens satisfies the expression:

$$d_{12}>d_{34}>d_{56};$$

where $d_{12}$ represents a distance between the first lens and the second lens on the optical axis, $d_{34}$ represents a distance between the third lens and the fourth lens on the optical axis, $d_{56}$ represents a distance between the fifth lens and the sixth lens on the optical axis.

12. The camera lens as claimed in claim 11, wherein the camera lens satisfies the expression:

$$D_6>D_1>D_2;$$

where $D_1$ represents the maximum diameter of the first lens, $D_2$ represents the maximum diameter of the second lens, $D_6$ represents the maximum diameter of the sixth lens.

13. A camera module, comprising a camera lens and an image sensor opposite to the camera lens, wherein the camera lens comprises:

a first group with a negative refractive power, the first group comprising a first lens and a second lens from an object side to an imaging surface of the camera lens, wherein the first lens is a biconcave lens with a negative refractive power, the second lens is a biconvex lens with a positive refractive power;

a second group with a positive refractive power, the second group comprising a third lens, a fourth lens, a fifth lens and a sixth lens from the object side to the imaging surface of the camera lens, wherein the third lens has a positive refractive power, a convex object side surface and a concave image side surface, the fourth lens is a biconcave lens with a negative refractive power, the fifth lens is a biconvex lens with a positive refractive power, the sixth lens has a positive refractive power, a convex object side surface and a concave image side surface, the fourth lens and the fifth lens are bonded together; and a stop, positioned between the first group and the second group.

14. The camera module as claimed in claim 13, wherein an image side surface of the fourth lens is bonded to an object side surface of the fifth lens to form a cemented body, the cemented body has a positive refractive power, the camera lens meets the expressions:

$$0.2<\varphi_{45}/\varphi<1.3$$

$$-0.06<\varphi_4+\varphi_5<0.01;$$

where $\varphi_{45}$ represents a refractive power of the cemented body, $\varphi$ represents a refractive power of the camera lens, $\varphi_4$ represents a refractive power of the fourth lens, $\varphi_5$ represents a refractive power of the fifth lens.

15. The camera module as claimed in claim 13, wherein the camera lens satisfies the expressions:

$$0.7<IH/(f*\tan\theta)<1;$$

$$(dn/dt)_2>2.5\times10^{-6}/°\ C.;$$

$$(dn/dt)_5\leq-2\times10^{-6}/°\ C.;$$

where IH represents a half actual image height of the camera lens, f represents a focal length of the camera lens, and $\theta$ represents a half-FOV of the camera lens, $(dn/dt)_2$ represents a temperature coefficient of refractive index of the second lens, $(dn/dt)_5$ represents a temperature coefficient of refractive index of the fifth lens.

16. The camera module as claimed in claim 13, wherein the camera lens satisfies the expressions:

$$Vd_2<40;$$

$$Vd_3<31;$$

$$Vd_4<25;$$

where $Vd_2$ represents an abbe number of a material of the second lens, $Vd_3$ represents an abbe number of a material of the third lens, $Vd_4$ represents an abbe number of a material of the fourth lens.

17. The camera module as claimed in claim 13, wherein the F number of the camera lens is less than 1.7, and a total optical length of the camera lens is less than 21 mm.

18. The camera module as claimed in claim 13, wherein the first lens to the sixth lens each are glass spherical lenses, the camera lens further comprises a filter and a flat glass, the filter is positioned between the sixth lens and the flat glass, and the flat glass is positioned between the filter and the imaging surface of the camera lens.

19. The camera module as claimed in claim 13, wherein the camera lens satisfies the expressions:

$$-4.5 < r_1/r_2 < -3.0;$$

$$d_{12} > d_{34} > d_{56};$$

$$D_6 > D_1 > D_2;$$

where $r_1$ represents a radius of curvature of an object side surface of the first lens, $r_2$ represents a radius of curvature of an image side surface of the first lens, where $d_{12}$ represents a distance between the first lens and the second lens on the optical axis, $d_{34}$ represents a distance between the third lens and the fourth lens on the optical axis, $d_{56}$ represents a distance between the fifth lens and the sixth lens on the optical axis, $D_1$ represents the maximum diameter of the first lens, $D_2$ represents the maximum diameter of the second lens, $D_6$ represents the maximum diameter of the sixth lens.

20. A vehicle camera, comprising a camera module, a processor, and a memory, wherein the camera module is configured to capture images, the processor is configured to process the captured images, and the memory is configured to store the images; the camera module comprises a camera lens and an image sensor opposite to the camera lens, from an object side to an imaging surface of the camera lens, the camera lens sequentially comprises:

a first lens, having a negative refractive power, a concave object side surface and a concave image side surface;

a second lens, having a positive refractive power, a convex object side surface and a convex image side surface;

a stop;

a third lens, having a positive refractive power, a convex object side surface and a concave image side surface;

a fourth lens, having a negative refractive power, a concave object side surface and a concave image side surface;

a fifth lens, having a positive refractive power, a convex object side surface and a convex image side surface, wherein the concave image side surface of the fourth lns is bonded to the convex object side surface of the fifth lens to fomi a cemented body whose refractive power is positive; and a sixth lens, having a positive refractive power, a convex object side surface and a concave image side surface;

wherein the camera lens meets the expressions:

$$-4.5 < r_1/r_2 < -3.0;$$

$$d_{12} > d_{34} > d_{56};$$

$$D_6 > D_1 > D_2;$$

where $r_1$ represents a radius of curvature of an object side surface of the first lens, $r_2$ represents a radius of curvature of an image side surface of the first lens, where $d_{12}$ represents a distance between the first lens and the second lens on the optical axis, $d_{34}$ represents a distance between the third lens and the fourth lens on the optical axis, $d_{56}$ represents a distance between the fifth lens and the sixth lens on the optical axis, $D_1$ represents the maximum diameter of the first lens, $D_2$ represents the maximum diameter of the second lens, $D_6$ represents the maximum diameter of the sixth lens.

* * * * *